United States Patent [19]

Farkas

[11] 4,338,115

[45] Jul. 6, 1982

[54] STARTING SAFETY CONTROL FOR A GLASSWARE FORMING MACHINE

[75] Inventor: Daniel S. Farkas, Toledo, Ohio

[73] Assignee: Owens-Illinois, Inc., Toledo, Ohio

[21] Appl. No.: 199,897

[22] Filed: Oct. 23, 1980

[51] Int. Cl.$^3$ ............................................. C03B 9/40
[52] U.S. Cl. ....................................... 65/29; 65/158; 65/159; 65/DIG. 13; 364/473; 364/476
[58] Field of Search .................. 65/29, 158, 159, 163, 65/DIG. 13; 364/473, 476

[56] References Cited

U.S. PATENT DOCUMENTS

3,762,907 10/1973 Quinn et al. ........................ 65/163
3,905,793 9/1975 Croughwell ........................ 65/163

*Primary Examiner*—Arthur D. Kellogg
*Attorney, Agent, or Firm*—Gerald T. Welch; Myron E. Click; Dave H. Wilson

[57] ABSTRACT

A starting safety control circuit for preventing automatic starts after a stop is accomplished in a glassware forming machine. When the machine start switch is actuated, a flag is reset. When the start switch is released, the flag is set. If the machine undergoes a stop, the subsequent actuation of the start switch and the presence of the flag will enable the machine to enter its start and run routines respectively. If the start switch fails in the on mode, the reset flag is not set and, after a stop, the machine is disabled by the presence of the reset flag even though the start signal is being generated by the failed start switch. The resetting and setting of the flag can be delayed by different predetermined times to prevent stray siganls or inadvertent momentary actuation of the start switch from changing the status of the flag. The machine stop can result from the actuation of an emergency stop switch, a programmed stop switch, or a sample switch.

16 Claims, 5 Drawing Figures

STARTING SAFETY CONTROL FOR A GLASSWARE FORMING MACHINE

BACKGROUND OF THE INVENTION

1. Field of the Invention

The present invention relates generally to machines for forming glassware articles from gobs of molten glass and in particular to safety controls for electronically controlled individual section glassware forming machines.

2. Description of the Prior Art

The individual section or IS glassware forming machine is well known and includes a plurality of sections each having means for forming glassware articles in a timed, predetermined sequence of steps. Typically, each section includes a blank mold station for receiving gobs of molten glass at a predetermined rate and for partially forming articles of glassware. A partially formed article of glassware of the type produced by the blank mold is typically referred to as a parison. The parison is then transferred to a blow mold station wherein the formation of the glassware articles is completed. The sections are operated in synchronism at a relative phase difference such that one section is receiving a gob while another section is delivering a finished glassware article to a conveyor and one or more other sections are performing various ones of the intermediate forming steps.

The forming means in each section are typically operated from pneumatic motors or actuators. In early prior art machines, the pneumatic motors were controlled by a valve block which in turn was controlled by a timing drum for each section driven from a line shaft which synchronized all parts of the machine. Manually adjustable cams were positioned on the timing drum for actuating the valves in the valve block. Timing was adjusted by loosening, moving and tightening the cams as the drum rotated.

One of limitations of the timing drum was the difficulty of adjusting the timing during the operation of the machine. One solution to this problem was to replace all the timing drums with an electronic control means. The electronic control means included a master unit which was responsive to a clock pulse generator and to a reset pulse generator both driven by the line shaft. The master unit generated reset signals to a separate control circuit for each of the individual sections to synchronize the operation of the individual circuits. Each control circuit included a pulse counter responsive to the clock pulses and the master unit generated reset pulses for counting the degrees of the section cycle. Each individual circuit included forty-eight, three-decade thumbwheel switches for setting the degree of rotation of the machine thereon. Thus, each particular function of the glassware forming cycle was controlled by one of the thumbwheel switches. Such a control system is disclosed in U.S. Pat. No. 3,762,907.

The previously described electronic control system utilized discrete components in its counter gating circuitry. In a later prior art control apparatus, a digital computer with a timing data memory and associated program storage was utilized. Not only did such a control circuit provide a means for automatically changing the timing values of the functions without the manual resetting of thumbwheel switches, but such a circuit also provided a means for programming events, groups of related functions, in accordance with certain boundary event timings. The computer generated the control signals through an interface circuit to actuate solenoid controlled valve blocks. Such a control system is disclosed in U.S. Pat. No. 3,905,793.

Typically, the prior art control systems had means for automatically performing a sequence of steps for moving the glassware forming mechanisms into positions for operation in a normal operating cycle. This was known as a programmed start. The prior art control systems also included means for initiating an emergency stop or a programmed stop. The emergency stop was effective at any time to immediately stop the machine and to release anything caught in the molds, the neck ring, or the blow head. The programmed stop was only effective during a normal operating cycle to automatically perform a sequence of steps for moving the glassware forming mechanisms into positions for ease of maintenance. The prior art control systems functioned to initiate an emergency stop if the programmed stop switch was actuated during a programmed start. One problems with the prior art control systems was the possibility that the machine could automatically restart upon the release of the emergency stop switch. If the programmed start circuitry malfunctioned so as to remain in the "on" condition, the release of the emergency stop switch, or the entry into a safe condition from a programmed stop or a sample routine, would cause the machine to enter the programmed start which could be dangerous to the operator or a maintenance person.

SUMMARY OF THE INVENTION

The present invention concerns a starting safety control circuit for preventing the automatic starting of a glassware forming machine after a stop. If the machine start switch fails in the on mode, the prior art control circuits allow the glassware forming machine to automatically restart after a stop. The present invention sets a flag in response to the termination of the start signal for enabling the machine to restart after a stop. The flag is reset upon the initiation of the start signal and the machine is disabled by the presence of the flag if the start switch fails in the on mode.

The starting safety control circuit can be formed from logic elements or programmed into the glassware forming machine control computer. The flag can be reset after a first predetermined time from the initiation of the start signal and can be set after a second predetermined time from the termination of the start signal. These time delays prevent stray signals or inadvertent momentary actuation of the start switch from setting or resetting the flag.

It is an object of the present invention to provide a control circuit for a glassware forming machine which prevents the automatic restarting of the machine after a stop when the start switch has failed in the on mode.

It is another object of the present invention to provide a control circuit for a glassware forming machine which is safer to operate than prior art control systems.

DESCRIPTION OF THE PREFERRED EMBODIMENT

Figure 1:
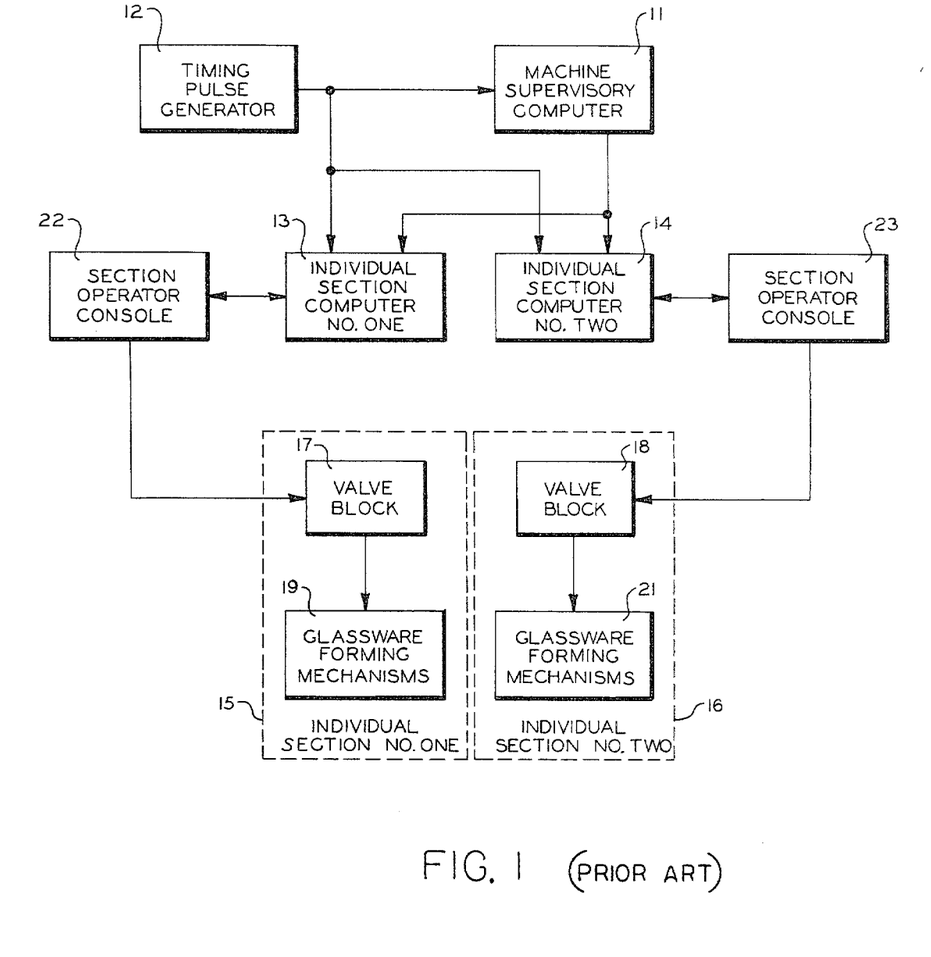
FIG. 1 is a block diagram of a two section IS machine to which the present invention is applicable.

There is shown in FIG. 1 a block diagram of an individual section glassware forming machine to which the present invention is applicable. Although a brief description appears herein, a more detailed description of this type of glassware forming machine can be found in U.S. Pat. No. 4,152,134 in the names of W. Thomas Dowling and Daniel F. Farkas, and assigned to the assignee of the present invention.

A machine supervisory computer 11 receives a train of timing pulses from a timing pulse generator 12 to establish the timing for the machine cycle. The machine supervisory computer 11 is connected to a pair of individual section computers 13 and 14 which are respectively connected to an individual section No. One 15 and an individual section No. Two 16. The individual sections 15 and 16 include valve blocks 17 and 18 respectively and a plurality of glassware forming mechanisms 19 and 21 respectively.

The individual sections 15 and 16 each receive gobs of molten glass from a gob distributor (not shown). The gob distributor supplies the gobs to the individual sections at a predetermined rate proportional to the speed of the gob distributor drive motor (not shown). The speed of this drive motor is determined by the frequency of the alternating current power generated by a power source such as an inverter drive (not shown). If the timing pulse generator 12 is responsive to the frequency of the power source, the cycle time of each individual section and, therefore, the cycle time of the machine will be proportional to the gob distribution rate.

Initially, the machine supervisory computer 11 loads the individual section computers 13 and 14 with control programs and timing data for controlling the associated individual sections. Thereafter, the individual section computers 13 and 14 control the glassware forming cycles of the associated individual sections by generating control signals to the respective valve blocks in response to the execution of the control programs and the timing pulses from the timing pulse generator 12.

The timing pulse generator 12 generates a clock signal to machine supervisory computer 11 and the individual section computers 13 and 14 which signal provides a reference for timing the machine cycle and the sequence of steps to be performed by the individual section computers. Typically, machine timing is expressed in degrees and a machine cycle is 360° in length. Thus, 360 clock pulses or some multiple thereof comprise one machine cycle. The cycle for each individual section is also 360°, but the cycles for the sections will be offset from the start of the machine cycle by a different number of degrees to compensate for the difference in gob delivery time to each section. The timing pulse generator 12 also generates a reset pulse after generating the clock pulses representing one cycle which reset pulse is utilized by the machine supervisory computer 11 and the individual section computers 13 and 14 to define the end and beginning of successive machine cycles. This type of timing pulse generator is the subject matter of U.S. Pat. No. 4,145,204 in the names of Daniel S. Farkas and Philip D. Perry and U.S. Pat. No. 4,145,205 in the names of Daniel S. Farkas and Erwin M. Ferenczy, both patents being assigned to the assignee of the present invention. The timing pulse generator can also be of the shaft encoder type. In either case, the rate of distribution of the gobs is synchronized with the clock signal generated by the timing pulse generator.

The valve blocks 17 and 18 are connected to control the glassware forming machanisms 19 and 21 respectively in a predetermined timed sequence of steps to form the articles of glassware. The valves in the valve blocks 17 and 18 are actuated by solenoids (not shown) which are controlled by the respective individual section computers in accordance with the control programs and timing data supplied by the machine supervisory computer 11.

A pair of section operator consoles 22 and 23 are connected to the individual section computers 13 and 14 respectively and to the valve blocks 17 and 18 respectively. The consoles 22 and 23 are used to make adjustments to the mechanism timing. For example, the actuation of a particular valve may be either advanced or retarded by the operator with the use of the console.

The section operator consoles 22 and 23 are also used to control the operating condition of the respective individual section. When an individual section is forming glassware, it is designated as being in the "run" condition and, when the section is not running, it is designated as being in the "safe" condition. The section operator consoles 22 and 23 each are provided with a machine start switch (not shown) for switching the respective individual section from the safe condition to the run condition and a machine stop switch (not shown) for switching the section from the run to the safe condition. When a section is in the safe condition, the forming machanisms are stopped and in a position for easy access such that the mechanisms can be replaced or repaired. The operator can switch to a manual mode wherein the solenoids of the valve block can be individually controlled using a plurality of switches (not shown) which are provided in the section operator console.

Figure 2:
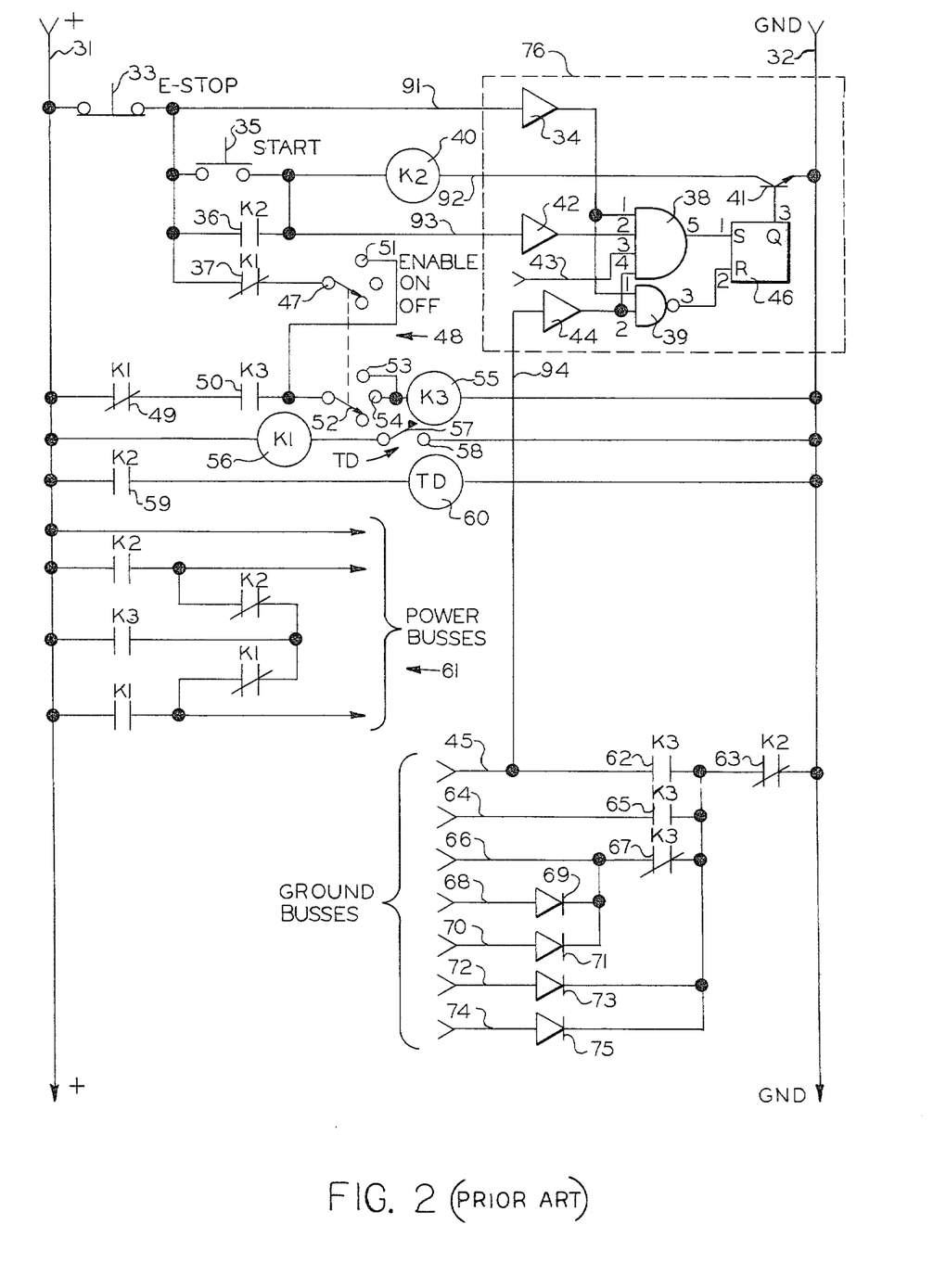
FIG. 2 is a schematic diagram of the prior art start switch logic circuit utilized in the IS machine shown in FIG. 1.

There is shown in FIG. 2 a schematic diagram of the prior art start circuit for an individual section glassware forming machine of the type shown in FIG. 1. The circuit is drawn in ladder diagram form with a line 31 representing a positive potential buss line, typically twenty-four volts direct current. A line 32 represents a ground potential buss line. A normally closed pushbutton E-STOP switch 33 has one side connected to the buss line 31. The other side of the switch 33 is connected to an input to a buffer 34, one side of a normally open pushbutton START switch 35, one side of a pair of normally open K2 relay contacts 36, and one side of a pair of normally closed K1 relay contacts 37. An output of the buffer 34 is connected to an input 38-1 of a four input AND gate 38. The output of the buffer 34 is also connected to an input 39-1 of a NAND gate 39. The other side of the switch 35 is connected to one side of the coil of a K2 relay 40 and the other side of the relay contacts 36 which are actuated by the coil of the relay 40. The other side of the coil of the relay 40 is connected to a collector of an NPN transistor 41.

The other side of the relay contacts 36 is connected to an input of a buffer 42. An output of the buffer 42 is connected to an input 38-2 of the AND gate 38. An input 38-3 of the AND gate 38 is connected to a line 43 which in turn is connected to a source (not shown) of a signal generated when the individual section is at the zero degree position in the glassware forming cycle. A buffer 44 has an input connected to a line 45 which in turn is connected to a circuit (not shown). The buffer 44 has an output connected to an input 38-4 of the AND gate 38 and an input 39-2 of the NAND gate 39. The AND gate 38 has an ouput 38-5 connected to a set input 46-1 of a flip flop 46. The NAND gate 39 has an output 39-3 connected to a reset input 46-2 of the flip flop 46. The flip flop 46 has a non-inverting output 46-3 connected to the base of the transistor 41. The transistor 41 has an emitter connected to the ground buss 32.

The other side of the relay contacts 37 is connected to movable contact 47 of a double pole, triple throw switch 48. A pair of normally closed K1 contacts 49, associated with the relay K1, have one side connected to the buss line 31 and another side connected to a pair of normally open K3 contacts 50. The contacts 50 have another side connected to a fixed contact 51 of the switch 48. The other side of the contacts 50 is also connected to a movable contact 52 of the switch 48, the movable contacts 47 and 52 being mechanically coupled for simultaneous movement. A pair of fixed contacts 53 and 54 of the switch 48 are connected to one side of a coil of a K3 relay 55. The other side of the relay coil of the relay 55 is connected to the ground buss 32. One side of a relay coil of a K1 relay 56 is connected to the buss 31 and the other side of the relay coil is connected to a movable contact 57 of a TD relay. A fixed contact 58 of the TD relay is connected to the ground buss 32. One side of a pair of normally open K2 contacts 59 is connected to the positive potential buss 31. The contacts 59 are associated with the K2 relay 40 and have the other side connected to one side of a coil of a TD relay 60. The other side of the coil of the TD 60 relay is connected to the ground buss 32.

Additional contacts associated with the K1, K2, and K3 relays and power buss lines are shown at 61. Although these elements form part of the circuitry, they are not essential to an understanding of the present invention and, therefore, will not be described in detail.

The line 45 is a "molds manual" signal line and is connected to one side of a pair of normally open K3 contacts 62 associated with the K3 relay 55. The other side of the relay contacts 62 is connected to one side of a pair of normally closed relay contacts 63 which are associated with the K2 relay 40. The other side of the relay contacts 63 is connected to the ground buss 32. A "majority manual" signal line 64 is connected to one side of a pair of normally open K3 relay contacts 65 having the other side connected to the junction of the relay contacts 62 and 63. A "neck ring open blow head up manual" signal line 66 is connected to one side of a pair of normally closed K3 relay contacts 67 having its other side connected to the junction of the relay contacts 62 and 63. The relay contacts 65 and 67 are both associated with the K3 relay 55. A "blank open E-STOP" signal line 68 is connected to an anode of a diode 69 having its cathode connected to the line 66. A "mold open E-STOP" signal line 70 is connected to an anode of a diode 71 having a cathode connected to the line 66. A "blow head up E-STOP" signal line 72 is connected to an anode of a diode 73 having its cathode connected to the junction between the contacts 62 and 63. A "neck ring open E-STOP" signal line 74 is connected to an anode of a diode 75 having its cathode connected to the junction between the relay contacts 62 and 63. The lines 45, 64, 66, 68, 70, 72, and 74 are each connected to control circuitry (not shown) for the individual section. The operation of the K2 relay 40 and the K3 relay 55 determine when a ground potential signal will appear on any one of these ground busses.

The circuitry shown in FIG. 2 will start the individual section control upon the closing of the START switch 35 and will stop operating the individual section upon the opening of the E-STOP switch 33. Assuming that the machine is not running, none of the coils of the relays K1, K2, K3, and TD are connected to the positive potential buss line 31, In order to start the machine, the START switch 35 is closed to connect the coil of the K2 relay 40 and the input of the buffer 42 to the positive potential buss 31. The buffer 42 switches its output signal from a logic "0" (ground potential) to a logic "1" (positive potential) at the input 38-2. Since the buffer 34 is connected to the positive potential buss 31 through the switch 33, a logic "1" is generated at the input 38-1. Assuming that the individual section is at zero degrees in its cycle, a logic "1" will be generated on the line 43 at the input 38-3. The line 45 is normally at logic "1" since relay contacts 62 are open. Thus, the buffer 44 will generate a logic "1" at the input 38-4. Since all of the inputs to the AND gate 38 are at "1", the gate will generate a "1" at a output 38-5 to the set input 46-1 of the flip flop 46. The flip flop 46 will be set to generate a "1" signal at its output 46-3 to turn on the transistor 41. Current will flow through the closed switches 33 and 35, through the coil of the relay 40 and through the transistor 41. The K2 relay 40 is thus energized closing the normally open contacts 36. When the start switch 35 is released to its open position, the contacts 36 will maintain the current path through the relay 40.

The energized relay 40 will also close the contacts 59 to apply power to the coil of the TD relay 60. The energized relay 60 will close the TD switch contacts 57 and 58 to connect the coil of the K1 relay 56 between the positive potential buss 31 and the ground potential buss 32. Thus, the relay contacts associated with the relays K1 and K2 included in the circuit elements 61 will be actuated. The relay contacts 63 will be opened to remove the ground potential from the ground busses 66, 68, 70, 72, and 74. The individual section is now enabled and will run through a start routine into a normal operation routine.

If the E-STOP switch 33 is operated while the individual section is running, the circuitry shown in FIG. 2 will stop the individual section. The coil of the K2 relay 40 will be disconnected from the positive potential buss 31 and the relay contacts 36 will open to remove the logic "1" signal from the input 38-2. The buffer 34 will generate a logic "0" at the input 38-1 and the input 39-1. The relay contacts 59 will open to de-energize the relay 60. The TD relay contacts 57 and 58 will then open to de-energize the K1 relay 56 after approximately two seconds. With the coils of the relays K1, K2 and TD de-energized, all the relay contacts will return to the position shown in FIG. 2. When the switch 33 was opened, the change from logic "1" to logic "0" at the input 39-1 changed the output signal at 39-3 from a logic "0" to a logic "1". This signal change reset the flip flop 46 to generate a logic "0" at the output 46-3 and turn off the transistor 41. When the switch 33 is released to its closed position, the buffer 34 again generates a logic "1" at the input 39-1 to return the input 46-2 to logic "0". Now the circuit is ready for the next actuation of the START switch 35.

If the START switch 35 had become jammed or stuck in the closed position, the circuitry would have operated in the manner described above until the switch 33 was released to its closed position. Then power would be applied through the stuck switch 35 to energize the K2 relay 40 and begin the start sequence automatically. Such a failure mode would not be desirable in an emergency situation.

Figure 3:
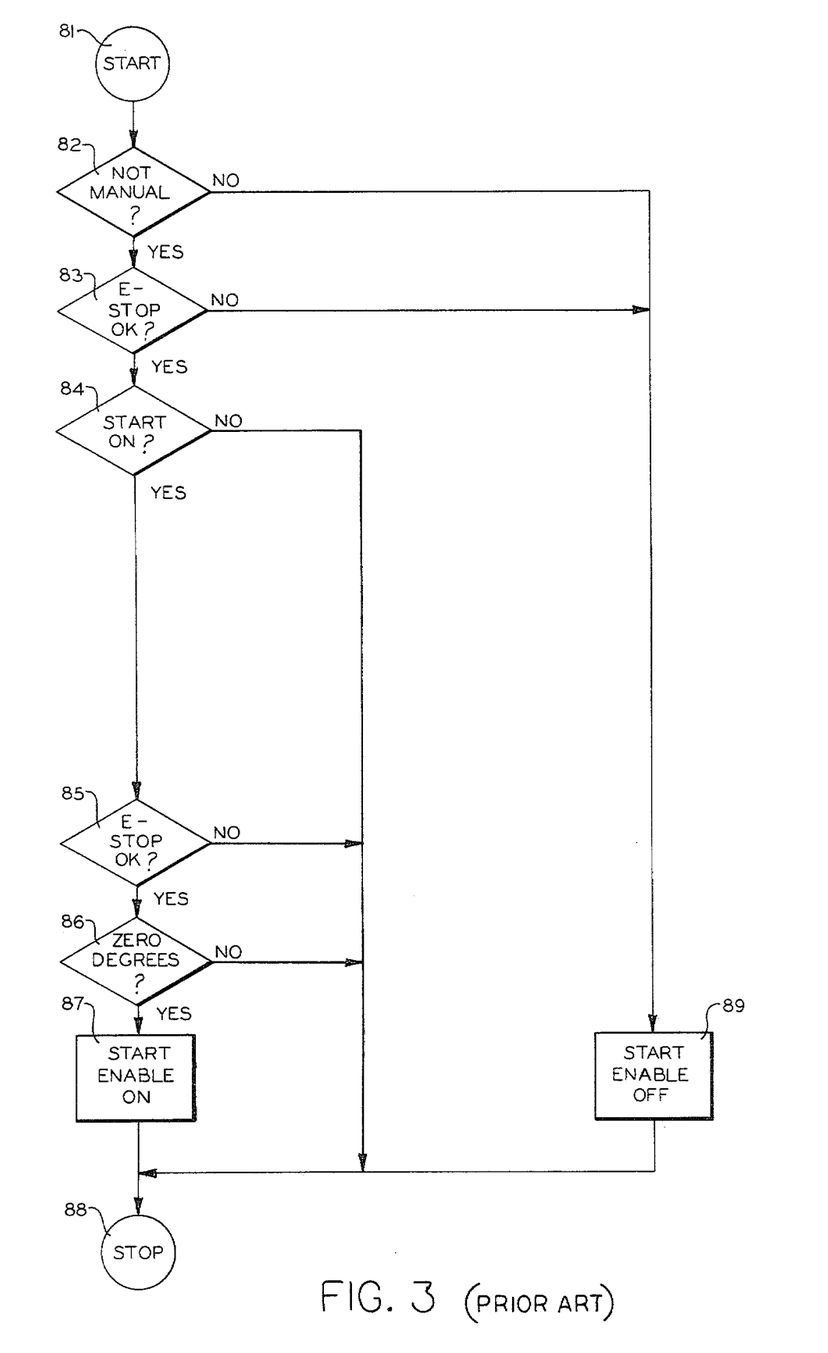
FIG. 3 is a flow diagram of the start switch logic utilized in the IS machine start switch circuit shown in FIG. 2.

The circuit elements enclosed by a dashed line 76 can also be implemented in one of the individual section computers 13 and 14 of FIG. 1. There is shown in FIG. 3 a flow diagram of the logic involved. The program is entered at a circle START 81 when the START switch 35 is depressed. The program enters a first decision point NOT MANUAL ? 82. If the manual switch 48 is in its off position, the program branches at YES to an E-STOP OK ? decision point 83. If the E-STOP switch 33 is closed, the program branches at YES to a START ON ? decision point 84. If the START switch 35 is closed, the program branches at YES to an E-STOP OK ? decision point 85. If the E-STOP switch 33 is closed, the program branches at YES to a ZERO DEGREES ? decision point 86. If the individual section is at the zero degree position in the glassware forming cycle, the program branches at YES to an instruction START ENABLE ON 87 which causes current flow to be established through the K2 relay 40. Thus, the start process has begun and the program exits at circle STOP 88.

The individual section can also be started utilizing the manual switch 48 of FIG. 2. If the switch 48 is moved to the enable position, power will be applied to the coil of the relay 55 through the switch 33, the relay contacts 37, the switch contacts 47 and 51, and the switch contacts 52 and 54. The energized K3 coil 55 then closes the switch contacts 50 to latch itself in the energized condition. The contacts in the circuit elements 61 and the contacts 62, 65 and 67 are also actuated by the K3 relay 55. The power busses are energized as if the K1 relay 56 and the K2 relay 40 had been actuated. The relay contacts 62 apply the ground potential to the input 38-4 through the buffer. Thus, the AND gate 38 is disabled and cannot set the flip flop 46 to turn on the transistor 41. Even if the START switch 35 were to be closed, no current will flow through the coil of the K2 relay 40. The line 64 will be connected to the ground potential buss 32 when the contacts 65 close and the lines 72 and 74 will remain connected to the ground potential buss 32.

The lines 66, 68 and 70 will be disconnected from the ground potential buss 32 when the contacts 67 open. The individual section is enabled and can be run manually utilizing circuitry not shown. In FIG. 3, the program would branch from the decision point 82 at NO if the manual switch 48 had been set to the manual position. The program would then execute an instruction START ENABLE OFF 89 to maintain the coil of the K2 relay 40 in a de-energized state. The program would then exit at the STOP circle 88.

In the circuit shown in FIG. 2, if the E-STOP switch 33 is open, there is no power available to generate the logic "1" signal to the buffer 42 and, therefore, the circuitry will not enable the start operation. In FIG. 3, the program would branch from the decision point 83 at NO to the instruction 89 or from the decision point 85 at NO to the STOP circle 88.

If the START switch 35 is not closed, the program in FIG. 3 branches from the decision point 84 at NO to the STOP circle 88. If the individual section is not at zero degrees in the glassware forming cycle, the program branches from the decision point 86 at NO to the STOP circle 88. These situations correspond to a logic "0" at the inputs 38-2 and 38-3 respectively of the AND gate 38 in FIG. 2.

Figure 4:
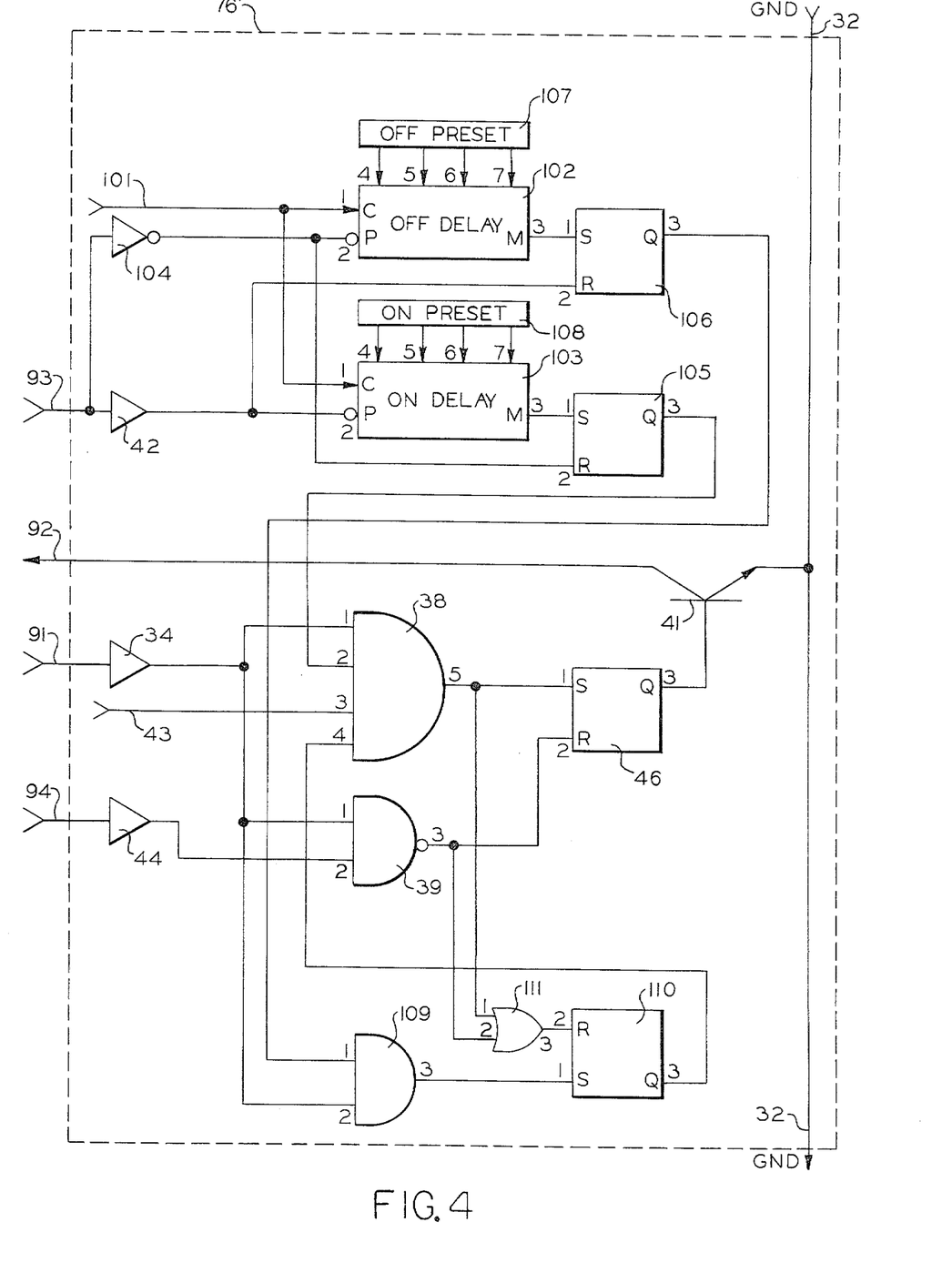
FIG. 4 is a schematic diagram of a start switch logic circuit according to the present invention.

There is shown in FIG. 4 a schematic diagram of the start enable circuitry according to the present invention. This circuitry is enclosed by a dashed line 76' and can be utilized to replace the circuitry enclosed by the dashed line 76 in FIG. 2. In FIG. 2, a line 91 connects the E-STOP switch 33 to the buffer 34, a line 92 connects the coil of the K2 relay 40 to the collector of the transistor 41, a line 93 connects the relay contacts 36 to the buffer 42, and a line 94 connects the line 45 to the buffer 44. The same lines 91 through 94 are shown in FIG. 4. Also shown in FIG. 4 are the buffer 34, the AND gate 38, NAND gate 39, transistor 41, buffer 42, line 43, buffer 44, and flip flop 46.

A line frequency input line 101 is connected between an alternating current power source (not shown) and a pair of clock inputs 102-1 and 103-1 of a pair of presettable counters 102 and 103 respectively. The line 93 is connected to an input of an inverter 104 having an output connected to a preset input 102-2 of the counter 102 and a reset input 105-2 of a flip flop 105. The line 93 is also connected to the input of the buffer 42 which has its output connected to a preset input 103-2 of the counter 103 and a reset input 106-2 of a flip flop 106. The counter 102 has an output 102-3 connected to a set input 106-1 of the flip flop 106. The counter 102 has plurality of data inputs 102-4 through 102-7 which are connected to a means for generating a preset number 107. The preset number generator 107 typically can be thumbwheel switches for generating a binary signal representation of the number to the counter 102. Similarly the counter 103 has an output 103-3 connected to a set input 105-1 of the flip flop 105. It also has a plurality of data inputs 103-4 through 103-7 which are connected to a preset number generating means 108. The line 92 is connected to the collector of the transistor 41 which has its emitter connected to the ground potential line 32. The line 91 is connected to the input of the buffer 34 which has its output connected to the input 38-1 of the AND 38 and the input 39-1 of the NAND 39. The output of the buffer 34 is also connected to an input 109-2 of an AND gate 109. The flip flop 105 has a non-inverting output 105-3 which is connected to the input 38-2 of the AND gate 38. The line 43 is connected to the input 38-3 of the AND gate 38. The line 94 is connected to the input of the buffer 44 which has its output connected to the input 39-2 of the NAND gate 39.

The output 38-5 of the AND gate 38 is connected to the set input 46-1 of the flip flop 46. The output 38-5 is also connected to a reset input 110-2 of a flip flop 110 through an OR gate 111 at an input 111-1. The flip flop 110 has a non-inverting output 110-3 which is connected to the input 38-4 of the AND gate 38. The NAND gate 39 has its output 39-3 connected to the reset input 46-2 of the flip flop 46 and to an input 111-2 of the OR gate 111. The flip flop 46 has its non-inverting output 46-3 connected to the gate of the transistor 41. The flip flop 106 has a non-inverting output 106-3 connected to an input 109-1 of the AND gate 109. The AND gate 109 has an output 109-3 connected to a set input 110-1 of the flip flop 110.

When the START switch 35 of FIG. 2 is closed, the buffer 42 generates a logic "1" at the reset input 106-2 to reset the output 106-3 of the flip flop 106 to logic "0". This logic "0" signal disables the AND gate 109 which generates a logic "0" at the set input 110-1 of the flip flop 110. The inverter 104 generates a logic "1" signal at the preset input 102-2 to load the preset number into the counter 102. The logic "1" signal from the inverter 104 also resets the flip flop 105 which generates a logic "0" at the input 38-2 to disable the AND gate 38. After counting number of line frequency cycles equal to the preset number, the counter 102 will generate a logic "1" signal to the set input 106-1 such that the flip flop 106 generates a logic "1" signal to the input 109-1 of the AND gate 109. Since the line 91 is at logic "1", the AND gate 109 generates a logic 1 at the set input 110-1 of the flip flop 110 which, in turn, generates a logic "1" at the set input 46-1. The flip flop 46 generates a logic "1" at the output 46-3 to turn on the transistor 41 and energize the K2 relay 40 on the line 92. The relay contacts 36 close to maintain the logic "1" signal on the line 93.

When the E-STOP switch 33 is opened, the line 93 will go to logic "0". The inverter 104 will generate a logic "1" at the reset input 105-2 to reset the flip flop 105. The flip flop 105 will generate a logic "0" at the input 38-2 to disable the AND gate 38. The buffer 42 generates a logic "0" at the preset input 103-2 to load the preset number into the counter 103. After a period of counting a number of line frequency cycles equal to the preset number, the counter 103 generates a logic "1" signal at the output 103 to the set input 105-1 of the flip flop 105. The flip flop 105 generates a logic "1" signal to the input 38-2 to enable the AND gate 38. Line 91 has gone to logic "0" and the buffer 34 generates the logic "0" at the input 39-1 to disable the NAND gate 39. The gate 39 generates logic "1" to the reset input 46-2 to reset the flip flop 46. The flip flop 46 generates a logic "0" at the output 46-3 to turn off the transistor 41. The gate 39 also resets flip flop 110 through the OR gate 111.

The counters 102 and 103 provide a time delay during which the switches 33 and 35 must be maintained in the actuated position in order for the circuit to turn off and turn on respectively. Such operation provides a safety factor to militate against actuation by stray signals or inadvertent momentary actuation of one of the switches.

If the START switch 35 fails in the closed mode, the circuit shown in FIG. 4 will not allow the individual section to be restarted after the E-STOP switch 33 has been actuated. The flip flop 110 is a flag which prevents the flip flop 46 from being set if the START switch 35 is closed when the E-STOP switch 33 is released. The flip flop 110 is reset to logic "0" at its output 110-3 when the flip flop 46 is set by the output from the AND gate 38 or when reset by the output from the NAND gate 39. If the START switch 35 is stuck closed, the line 93 will return to logic "1" when the E-STOP switch 33 is released. This logic "1" will reset the flip flop 106 which will place a logic "0" at the input 109-1 to disable the AND 109. Thus, the flip flop 110 cannot be set when the E-STOP switch 33 is released to generate a logic "1" on the line 91 to the input 109-2. Thus, the AND gate 109 and the flip flop 110 prevent the setting of the flip flop 46 as long as the START switch 35 remains in the closed failure mode.

Figure 5:
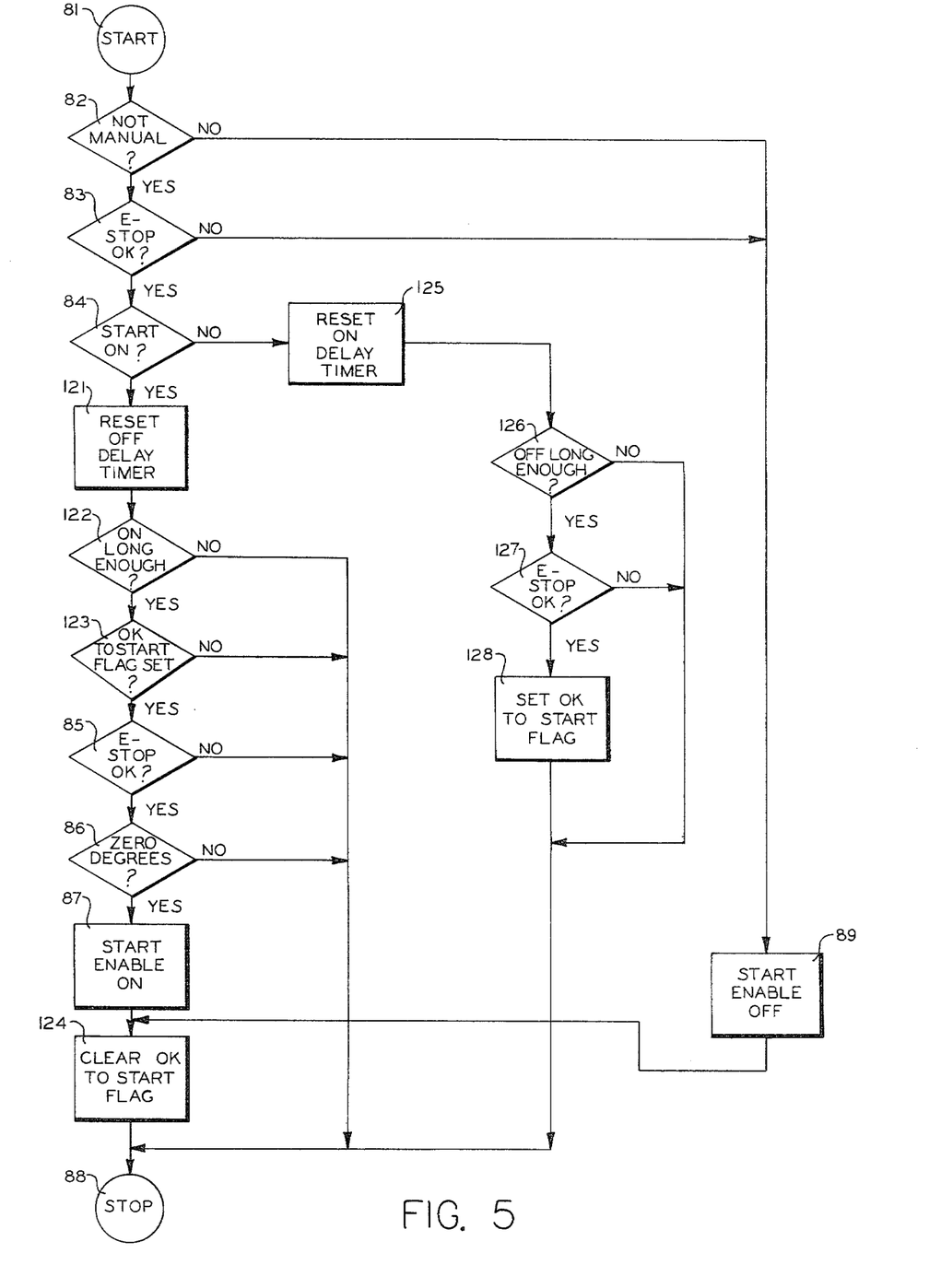
FIG. 5 is a flow diagram of the start switch logic utilized in the start switch circuit shown in FIG. 4.

The circuitry shown in FIG. 4 can also be implemented in one of the individual section computers 13 and 14 shown in FIG. 1. There is shown in FIG. 5, a flow diagram of the required logic circuitry with logic symbols 81 through 89 corresponding to the like-numbered symbols of FIG. 3. When the program branches from the decision point 84 at YES, a RESET OFF DELAY TIMER instruction 121 is executed. This instruction corresponds to the generation of the logic "0" signal at the preset input 102-2 and the logic "1" signal at the reset input 106-2. The program then enters an ON LONG ENOUGH ? decision point 122. This decision point corresponds to the setting of the flip flop 105. If the start switch has been on long enough, the program branches at YES to an OK TO START FLAG SET ? decision point 123. If the flag has been set, the program branches at YES to the decision point 85. If the program branches at YES from each of the decision points 122, 123, 85, and 86, the circuitry is in the same condition as if all of the inputs to the AND gate 38 were at logic "1". If the program branches at NO from any one of these decision points, it exits at the STOP circle 88. After the program executes the instruction 87, it executes a CLEAR OK TO START FLAG instruction 124. This corresponds to the resetting of the flip flop 110 of FIG. 4. The program then exits at the STOP circle 88.

If the program branches from the decision point 84 at NO, it executes a RESET ON DELAY TIMER instruction 125. This instruction corresponds to the resetting of the counter 103 in FIG. 4. The program then enters an OFF LONG ENOUGH ? decision point 126. After the off time delay has expired, the program branches at YES to an E-STOP OK ? decision point 127. If the E-STOP switch is closed, the program branches at YES to a SET OK TO START FLAG instruction 128. The instruction 128 corresponds to the setting of the flip flop 110 in FIG. 4. The program then returns to the STOP circle 88. If either the off time delay is not sufficient or the E-STOP switch is opened, the program branches from the decision points 126 and 127 respectively at NO and bypasses the instruction 128. Such operation corresponds to a logic "0" at one of the inputs to the AND gate 109.

Although the present invention has been illustrated in terms of preventing an automatic restart after an emergency stop, the present invention will also prevent an automatic restart from a safe condition after a programmed stop or a stop from a sample routine. Referring to FIG. 5, the subroutine shown is entered after checking the status of both the programmed stop switch and the sample switch. If both switches are in the "off" mode, and the start switch is in the "on" mode, the subroutine will be entered. Thus, the subroutine will be entered from a safe condition after either a programmed stop or a sample routine to prevent an automatic restart caused by a failed start switch.

With reference to FIG. 4, the flip flop 110 also functions as a flag to prevent an automatic restart from a safe condition. Through circuitry associated with the programmed stop and sample switches (not shown), the start switch circuitry is only effective if both of these switches are not actuated and the machine is in the safe condition. If the start switch has failed in the "on" mode, the flip flop 110 prevents an automatic restart.

In accordance with the provisions of the patent statutes, the principle and mode of operation of the invention have been explained in its preferred embodiment. However, it must be understood that the invention may be practiced otherwise than as specifically illustrated and described without departing from its spirit or scope.

What is claimed is:

1. In a machine for forming articles of glassware from gobs of molten glass, the machine including forming means responsive to a plurality of control signals for controlling the machine in a start routine, a run routine for forming articles of glassware from the gobs of molten glass, and a stop routine; a means for generating a start signal; means for generating a stop signal; a means responsive to said start signal for generating a first group of the control signals for controlling the machine in the start routine; and a means responsive to said stop signal for generating a second group of the control signals for controlling the machine in the stop routine, a control means comprising: means responsive to continued generation of the start signal and the initiation and the termination of the stop signal for disabling the means for generating a first group of the control signals whereby the machine is prevented from automatically restarting after a stop.

2. The control means according to claim 1 wherein said means for disabling includes means responsive to the initiation of the start signal for generating a flag disable signal and wherein the means for generating a first group of the control signals is responsive to said flag disable signal for preventing the initiation of the first group of the control signals.

3. The control means according to claim 2 wherein said means for disabling includes means responsive to the initiation of the start signal for generating a reset flag signal after a first predetermined time and wherein said means for generating a flag disable signal is responsive to said reset flag signal for generating said flag disable signal.

4. The control means according to claim 3 wherein said means for disabling includes means responsive to the termination of the start signal for generating a flag enable signal and wherein the means for generating a first group of the control signals is responsive to said flag enable signal for enabling the initiation of the first group of the control signals.

5. The control means according to claim 4 wherein said means for disabling includes means responsive to the termination of the start signal for generating a set flag signal after a second predetermined time and wherein said means for generating a flag enable signal is responsive to said set flag signal for generating said flag enable signal.

6. The control means according to claim 1 wherein said means for disabling includes means responsive to the initiation of the start signal for generating a flag disable signal and means responsive to the termination of the start signal for generating a flag enable signal, and wherein the means for generating a first group of the control signals is responsive to said flag disable and said flag enable signals respectively for preventing the initiation of and enabling the initiation of the first group of the control signals.

7. The control means according to claim 6 wherein said means for disabling includes means responsive to the initiation of the start signal for generating a reset flag signal after a first predetermined time and wherein said means for generating a flag disable signal is responsive to said reset flag signal for generating said flag disable signal.

8. The control means according to claim 7 wherein said means for disabling includes means responsive to the termination of the start signal for generating set flag signal after a second predetermined time and wherein said means for generating a flag enable signal is responsive to said set flag signal for generating said flag enable signal.

9. The control means according to claim 1 wherein the stop switch is an emergency stop switch and the stop routine is an emergency stop routine.

10. The control means according to claim 1 wherein the stop switch is a programmed stop switch and the stop routine is a programmed stop routine.

11. The control means according to claim 1 wherein the stop switch is a sample switch and the stop routine is a sample routine.

12. A method of controlling a machine for forming articles of glassware from gobs of molten glass, the machine including forming means responsive to a plurality of control signals for controlling the machine in a start routine, a run routine for forming articles of glassware from the gobs of molten glass, and a stop routine; a means for generating a start signal; a means for generating a stop signal; a means responsive to the start signal for generating a first group of the control signals for controlling the machine in the start routine and the run routine; and a means responsive to the stop signal for generating a second group of control signals for controlling the machine in the stop routine, the method comprising the steps of
generating a flag disable signal in response to the initiation of the start signal;
generating a flag enable signal in response to the termination of the start signal;
enabling the means for generating the first group of the control signals in response to the generation of the start signal and the flag enable signal;
and disabling the means for generating the first group of control signals in response to the flag disable signal and the termination of the stop signal before the termination of the start signal.

13. The method according to claim 12 wherein the step of generating said flag disable signal is delayed for a first predetermined time after the initiation of the start signal.

14. The method according to claim 12 wherein the stop routine is an emergency stop routine and the means for generating a stop signal generates an emergency stop signal.

15. The method according to claim 12 wherein the stop routine is a programmed stop routine and the means for generating a stop signal generates a programmed stop signal.

16. The method according to claim 12 wherein the stop routine is a sample routine and the means for generating a stop signal generates a sample routine signal.

* * * * *